(No Model.)
C. PAYEN.
INSULATOR FOR ELECTRIC BATTERIES.
No. 415,333. Patented Nov. 19, 1889.
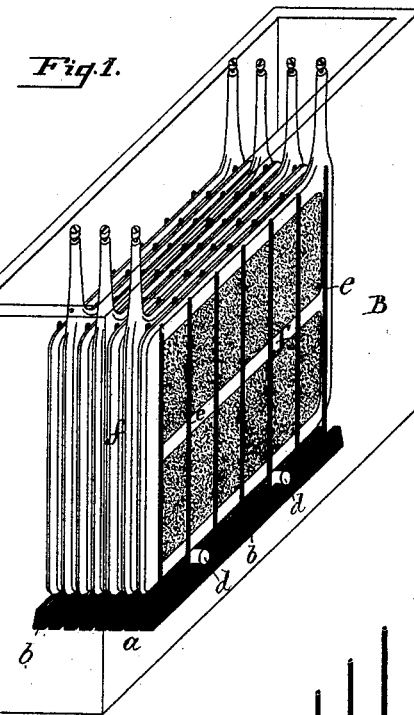
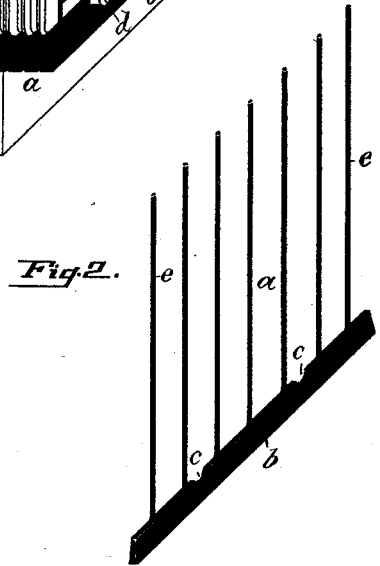
WITNESSES:
Hermann Bormann
Thomas M. Smith
INVENTOR:
Clement Payen,
By J. Walter Douglass.
ATT'Y.

UNITED STATES PATENT OFFICE.

CLÉMENT PAYEN, OF PHILADELPHIA, PENNSYLVANIA, ASSIGNOR TO THE ELECTRIC STORAGE BATTERY COMPANY, OF GLOUCESTER CITY, NEW JERSEY.

INSULATOR FOR ELECTRIC BATTERIES.

SPECIFICATION forming part of Letters Patent No. 415,333, dated November 19, 1889.

Application filed August 27, 1888. Serial No. 283,840. (No model.)

*To all whom it may concern:*

Be it known that I, CLÉMENT PAYEN, a citizen of the Republic of France, but now residing at the city of Philadelphia, in the county of Philadelphia and State of Pennsylvania, have invented certain new and useful Improvements in Insulators for Electric Batteries, of which the following is a specification.

The object of my invention is to provide an improved insulating device for firmly supporting in position in a cell or vessel the plates or elements of secondary or storage batteries and completely insulating them from each other therein.

My invention consists of an insulating device composed of gutta-percha, caoutchouc, (india-rubber,) or other somewhat analogous material formed into a horizontal bar, with a series of vertical rods and with recesses at suitable distances apart formed in the surface of said bar for the reception of glass or other insulators, and on which the plates or elements rest mounted in the cell or vessel.

The nature and characteristic features of my invention will be more fully understood by reference to the accompanying drawings, forming part hereof, and in which—

Figure 1 is a perspective view of a cell or vessel with two systems of plates or elements supported in position therein and insulated from each other by means of a series of my improved insulating devices, and Fig. 2 is a perspective view of one of my improved insulating devices.

Referring to the drawings for a further description of my invention, $a$ is the insulating device, made of gutta-percha, caoutchouc, (india-rubber,) or other material, and consisting, preferably, of a horizontal tapering bar $b$, having semicircular recesses $c$ formed at suitable distances apart in the surface thereof for the reception of glass or other insulators $d$, arranged transversely to the insulating devices $a$ when in position for use.

$e$ is a series of vertical rods made, preferably, of the same material as the horizontal bar $b$, and these vertical rods $e$ are either secured into said bar or formed integral therewith.

The vertical rods $e$ are preferably constructed round, so that when in position between the plates or elements $f$ they will not only completely insulate the plates or elements from each other, but will present as little insulating surface as possible to the active portion of the plates to interfere with charging of them mounted in battery.

The manner of using the improved device is as follows: In a cell or vessel B a series of the insulating devices $a$ are mounted, with the horizontal bars $b$ thereof resting in the bottom of the cell or vessel B. In the recesses $c$ are mounted transversely to these bars $b$ glass or other insulators $d$, and the plates or elements $f$ inserted, so that an insulating device $a$ will come between the plates and between the last plate on each side and the cell or vessel B, as shown in Fig. 1. A suitable fluid is then introduced into the cell in sufficient quantity to completely immerse the plates or elements, and they are now in condition to receive electrical energy by coupling up the terminals of one system of plates by means of a wire with the positive electrode of a dynamo and coupling up the terminals of the opposite system of plates by means of a wire with the negative electrode of a dynamo.

Having thus described the nature and objects of my invention, what I claim as new, and desire to secure by Letters Patent, is—

1. The herein-described insulating device, consisting of a horizontal bar provided with a series of vertical rods, substantially as and for the purposes set forth.

2. The herein-described insulating device, consisting of a horizontal tapering bar provided with recesses in the surface thereof, and vertical rods formed integral with said bar, substantially as and for the purposes set forth.

In witness whereof I have hereunto set my signature in the presence of two subscribing witnesses.

CLÉMENT PAYEN.

Witnesses:
 HERMANN BORMANN,
 FRANK C. LEWIN.